United States Patent [19]

Brady et al.

[11] Patent Number: 4,673,896
[45] Date of Patent: Jun. 16, 1987

[54] MICROWAVE TRANSMITTING AND RECEIVING ARRANGEMENTS

[75] Inventors: Michael B. C. Brady, Maldon; Archie W. Crook, Chelmsford, both of England

[73] Assignee: English Electric Valve Company, Limited, Chelmsford, England

[21] Appl. No.: 561,179

[22] Filed: Dec. 14, 1983

[30] Foreign Application Priority Data

Dec. 16, 1982 [GB] United Kingdom ............... 8235816

[51] Int. Cl.$^4$ ............................................. H01P 1/04
[52] U.S. Cl. ........................................ 333/13; 455/81
[58] Field of Search ..................... 333/13; 343/5 R; 455/81

[56] References Cited

U.S. PATENT DOCUMENTS 2,773,978 12/1956 Friis ....................................... 455/81
2,853,684 9/1958 Carter et al. .......................... 333/13
3,891,884 6/1975 Tisdale .

FOREIGN PATENT DOCUMENTS 940554 12/1948 France .
627012 7/1949 United Kingdom .
632691 11/1949 United Kingdom .

OTHER PUBLICATIONS

Norman J. Brown, "Design Concepts for High-Power PIN Diode Limiting", IEEE Transactions on Microwave Theory and Techniques, vol. MTT-15, No. 12, Dec. 1967, pp. 732-742.

Primary Examiner—Thomas H. Tarcza
Assistant Examiner—Donald E. Hayes, Jr.
Attorney, Agent, or Firm—Spencer & Frank

[57] ABSTRACT

A radar system having a common antenna for transmitting and receiving signals conventionally includes a branch duplexer which is bulky and inconvenient.

By using a waveguide section having an antenna port at one end and a receiver port at the other, and including a protection unit comprising p.i.n. diodes these difficulties are reduced. The diodes prevent transmitted energy from a magnetron reaching the receiver port but allow received energy, because of its lower amplitude, to pass.

19 Claims, 2 Drawing Figures

MICROWAVE TRANSMITTING AND RECEIVING ARRANGEMENTS

BACKGROUND OF THE INVENTION

This invention relates to microwave transmitting and receiving arrangements and more particularly to such arrangements in which a magnetron is used as a microwave source, as, for example in radar systems in which a common antenna is employed for transmitting signals originating from said magnetron and receiving return signals from a target.

Conventionally such a radar system may use an arrangement as shown schematically and partly in section in FIG. 1. A magnetron 1 generates microwave energy during transmission which is coupled into a waveguide section 2 via a co-axial line 3 terminated in a probe 4 and a ceramic or glass dome 5. The magnetic member 6 of the magnetron 1 is of "horseshoe" form, as viewed, forming a magnetic loop from pole piece to pole piece.

Energy from the magnetron 1 is propagated in both directions along the waveguide section 2. In one direction (to the right as illustrated) the energy is incident on an end wall of the waveguide section 2, which is known as a backstop 7. This acts as a short circuit and is positioned such that the incident energy is reflected and adds to the energy propagated in the opposite direction to give a combined signal.

The combined signal is coupled into a branch duplexer 8 which has an antenna arm 8A and a receiver arm 8B. Part of the signal passes along the antenna arm 8A. The remainder enters the receiver arm 8B where it is coupled into a protection unit 9. The unit 9 comprises a short section of waveguide having therewithin two oppositely poled p.i.n. diodes 10 and 11. Such protection units are sometimes referred to as diode limiters. The unit 9 acts to reflect energy having a high amplitude and transmit low amplitude energy. The energy from the magnetron 1 has a relatively high amplitude and hence is reflected by the protection unit 9. The positioning of the protection unit 9 is such tht the reflected energy is added to the signal in the antenna arm 8A and thus most of the energy from the magnetron 1 is passed, via an antenna port 12 located at the end of the antenna arm 8A, to an antenna (not shown) where it is transmitted.

During the systems receiving mode, a signal received at the antenna is passed via the antenna port 12 to the antenna arm 8A. Part of the signal then enters the receiver arm 8B and part the waveguide section 2. That part in the waveguide section 2 is reflected by the backstop 7 and is directed into the receiver arm 8B where it is added to the rest of the signal. The resultant signal is coupled into the protection unit 9. This resultant signal has a very low amplitude compared with the magnetron output, insufficient in fact to trigger the protection unit 9, and thus passes through to the output port 13 of the protection unit 9 with little attenuation. Output port 13 consitutes a receiver port to which a receiver (not shown) is connected.

There are a number of disadvantages associated with such an arrangement. The apparatus is bulky and comprises a number of sections which must be accurately aligned. The sections must also be carefully designed and manufactured to have the correct dimensions. The apparatus therefore is also quite expensive.

The present invention seeks to reduce or eliminate these disadvantages.

SUMMARY OF THE INVENTION

According to this invention, a microwave transmitting and receiving arrangement comprises: a channel capable of transmitting microwave energy, having a first port at one end and a second port at another end; a microwave source arranged to propagate microwave energy into the channel in both directions at a position between the first and second ports; and means, located between said position and the second port, arranged to reflect microwave energy propagated theretowards from said microwave source and to pass microwave energy of a relatively lower amplitude incident thereon and received via said first port.

Normally said microwave source comprises a magnetron. Preferably, where said microwave source comprises a magnetron, the magnetic member of the magnetron surrounds the channel at the said position.

According to a feature of the invention a radar includes an arrangement in accordance with the invention, said radar having one antenna for both transmission and reception of signals connected to said first port.

DETAILED DESCRIPTION OF THE PREFERRED EMBODIMENT

Figure 1:
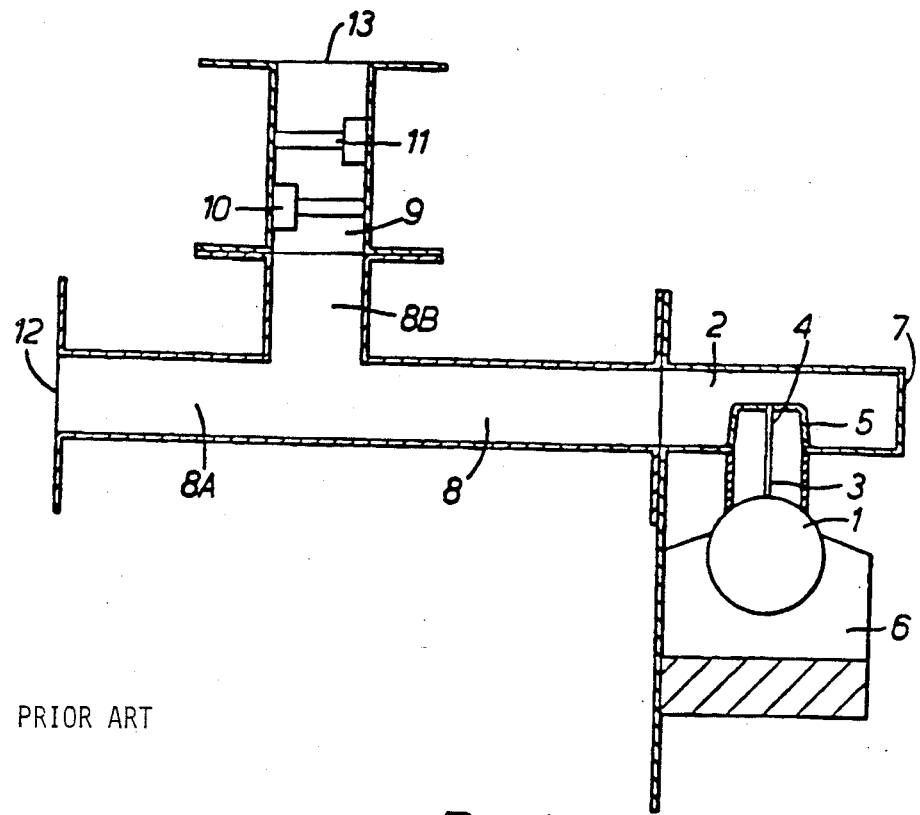
FIG. 1 is a schematic diagram, partially in longitudinal section, of a microwave transmitting and receiving arrangement according to the prior art.
Figure 2:
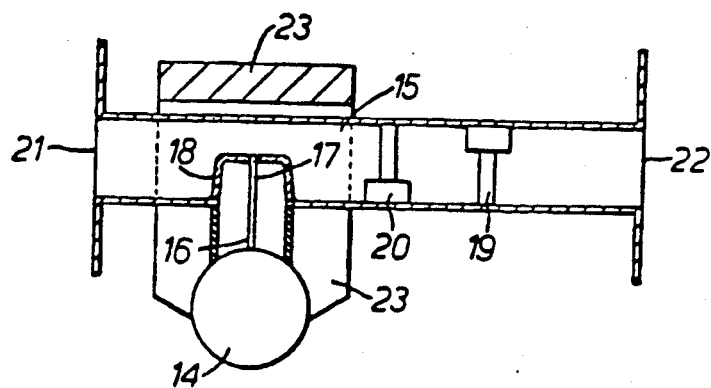
FIG. 2 is a schematic diagram, partly in longitudinal section of a microwave transmitting and receiving arrangement in accordance with the present invention.

With reference to FIG. 2, a radar system having a common antenna (not shown) for transmitting and receiving signals includes a magnetron 14 which generates microwave energy. During transmission, the magnetron output is coupled into a channel or waveguide section 15 via a co-axial line 16, probe 17 and glass dome 18. The energy propagates in both directions along the waveguide section 15 and in one direction (to the right as shown) is incident on two oppositely poled p.i.n. diodes 19 and 20 which act in a similar way to the protection unit 9 in the conventional arrangement as previously described with reference to FIG. 1, i.e. they reflect high amplitude energy and transmit low amplitude energy. The positions of the diodes 19 and 20 are chosen so that the reflected energy adds to that energy from the magnetron 1 propagating in the opposite direction towards antenna port 21 at the other end of the waveguide section 15. The resulting signal is transmitted via antenna port 21 to said common antenna. The diodes 19 and 20 act as the short circuit which is provided by the backstop 7 in the conventional apparatus.

When a signal is received at the antenna it is passed via the antenna port 21 to the waveguide section 15. The received signal has a relatively low amplitude compared with the output of the magnetron 1 and is passed by the diodes 19 and 20 to the other end of the waveguide section 15, where a receiver port 22 is located. The length of the coaxial line 16 is designed so that only a small amount of any received energy which enters it is absorbed.

Consequently a high proportion of the received signal reaches the receiver port 22 and then enters a receiver (not shown).

The magnetic member 23 of the magnetron 1 is of "horsehoe" configuration, as in the conventional arrangement, but surrounds the waveguide section 15 and the coaxial line 16, probe 17 and dome 18 through which the magnetron output is propagated. Hence the bulk of the arrangement is reduced still further.

We claim:

1. A microwave transmitting and receiving arrangement comprising: a channel capable of transmitting microwave energy, having a first port at one end and a second port at another end; a microwave source arranged at a position between the first and second ports to propagate microwave energy into the channel so that at the time of introduction the energy propagates toward both the first and second ports; and means, located between said position and the second port, arranged to provide a short-circuit for and reflect microwave energy propagated theretowards from said microwave source and to pass microwave energy of a relatively lower amplitude incident thereon and received via said first port.

2. An arrangement as claimed in claim 1 where in said first port is an antenna port.

3. An arrangement as claimed in claim 1 wherein said second port is a receiver port.

4. An arrangement as claimed in claim 1 wherein said microwave source comprises a magnetron.

5. An arrangement as claimed in claim 4 wherein said magnetic member of said magnetron surrounds the channel at the said position.

6. An arrangement as claimed in claim 1 wherein said means includes a diode limiter.

7. A radar including an arrangement as claimed in claim 1, with said radar having one antenna for both transmission and reception of signals connected to said first port.

8. An arrangement as defined in claim 1, wherein said means are located such that the microwave energy reflected by said further means adds to the energy from said source propagating in the direction toward said first port.

9. An arrangement as defined in claim 8, wherein said microwave source is arranged to propagate its microwave energy directly into said channel.

10. A microwave transmitting and receiving arrangement comprising: a waveguide section capable of transmitting microwave energy and having a first port at one end and a second port at its other end; a microwave source; means for coupling the microwave energy from said source into said waveguide section at a position between said first and second ports and so that it can propagate in both directions along said waveguide section; and further means, located between said position and said second port, for presenting a short-circuit to energy propagated from said source in the direction of said second port, and for reflecting relatively high, and passing relatively low, amplitude microwave energy incident thereon such that relatively high energy is prevented from reaching said second port.

11. An arrangement as defined in claim 9 wherein said further means are located such that the microwave energy reflected by said further means adds to the energy from said source propagating in the direction toward said first port.

12. An arrangement as defined in claim 10 wherein said means for coupling includes a probe extending into said waveguide section for causing the microwave energy from said source to propagate directly into said waveguide section.

13. An arrangement as defined in claim 12 wherein said microwave source comprises a magnetron having a horseshoe shaped magnet, and said magnet surrounds said waveguide section at said position.

14. An arrangement as defined in claim 10 wherein said first port is an antenna port.

15. An arrangement as defined in claim 14 wherein said second port is a receiver port.

16. An arrangement as defined in claim 10 wherein said further means includes a diode limiter.

17. An arrangement as defined in claim 16 wherein said diode limiter includes a pair of oppositely poled pin diodes.

18. A radar system including an arrangement as defined in claim 1, wherein said radar system has one antenna for both transmission and reception of signals connected to said first port.

19. An arrangement as defined in claim 1 wherein said channel comprises a single unbranched section of waveguide having said first port at one of its ends and said second port at its other end, with said first port being an antenna port and said second port being a receiver port.

* * * * *